(12) United States Patent
Proeschel

(10) Patent No.: US 8,439,571 B2
(45) Date of Patent: May 14, 2013

(54) SEALING ARRANGEMENT FOR A BEARING

(75) Inventor: Christian Proeschel, Wuerzburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 278 days.

(21) Appl. No.: 12/674,116

(22) PCT Filed: Aug. 27, 2008

(86) PCT No.: PCT/DE2008/001431
§ 371 (c)(1),
(2), (4) Date: Feb. 18, 2010

(87) PCT Pub. No.: WO2009/030201
PCT Pub. Date: Mar. 12, 2009

(65) Prior Publication Data
US 2011/0188791 A1 Aug. 4, 2011

(30) Foreign Application Priority Data

Sep. 6, 2007 (DE) .......................... 10 2007 042 368

(51) Int. Cl.
F16C 33/76 (2006.01)

(52) U.S. Cl.
USPC .......................................................... 384/486

(58) Field of Classification Search .......... 384/484–486; 277/351, 353
See application file for complete search history.

(56) References Cited

U.S. PATENT DOCUMENTS

| 4,792,243 | A * | 12/1988 | Takeuchi et al. | 384/486 |
| 7,258,490 | B2 * | 8/2007 | Peschke et al. | 384/485 |
| 2005/0089254 | A1 * | 4/2005 | Takehara et al. | 384/484 |

FOREIGN PATENT DOCUMENTS

| DE | 198 53 187 X | 6/2000 |
| EP | 1 489 320 X | 12/2004 |

* cited by examiner

Primary Examiner — Thomas R Hannon
(74) Attorney, Agent, or Firm — Lucas & Mercanti, LLP

(57) ABSTRACT

A sealing arrangement which has a long or increased service life and high reliability even in soiled or aggressive surroundings. The sealing arrangement for a bearing has a first bearing ring and second bearing, which is rotatable relative to the first bearing ring, and a seal that is arranged in the region of the first bearing ring and that extends in the direction of the bearing periphery. The second bearing ring has a peripheral sealing surface and the seal has at least two peripheral sealing lips that sealingly rest on the sealing surface.

9 Claims, 2 Drawing Sheets

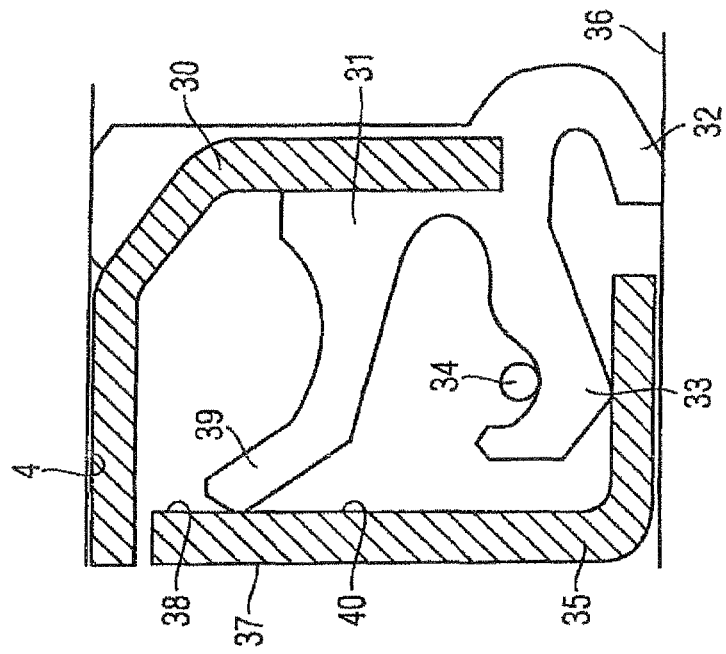
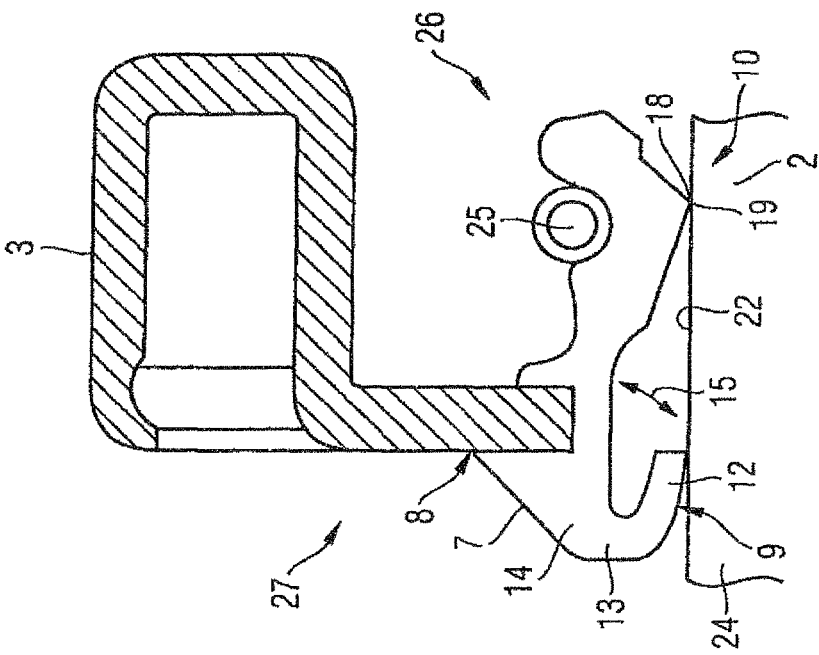

SEALING ARRANGEMENT FOR A BEARING

This application is a 371 of PCT/DE2008/001431 filed Aug. 27, 2008, which in turn claims the priority of DE 10 2007 042 368.5 filed Sep. 6, 2007, the priority of both applications is hereby claimed and both applications are incorporated by reference herein.

FIELD OF THE INVENTION

The invention is within the field of rolling contact bearings and sliding contact bearings and relates to a sealing arrangement for a bearing in which a first bearing ring is rotatable relative to a second bearing ring, with rolling contact elements or a sliding contact surface arranged in between.

Bearings of this kind are used for many different applications, it being possible, for example, for the first bearing ring to be designed as a bearing outer ring and to be accommodated by a bearing outer ring housing, while the second bearing ring may be mounted on a rotating machine element, e.g. a shaft or axle.

The quality of a bearing assembly and hence the service life and endurance of a bearing assembly depend to a quite considerable extent on the quality and undisturbed rolling or sliding of the corresponding rolling contact or bearing surfaces. In the case of a rolling contact bearing, unimpaired rolling of the rolling contact elements on the associated running surfaces of the first and second bearing ring is thus essential. This rolling contact motion can be disrupted by the unwanted intrusion of foreign bodies, such as, for example, dirt or abrasion particles, thus jeopardizing the reliability of the bearing and shortening its service life in the worst case scenario.

These requirements are particularly significant where the bearings are used in areas susceptible to contamination to a relevant degree, especially in the wheel bearing assembly of aircraft/airplanes. In this case, there can, on the one hand, be very intense acceleration of the landing gear tires and hence of the wheel bearings during the takeoff and landing process, for example, in surroundings which are sometimes contaminated (runways). With aircraft, there are furthermore pressure equalization processes owing to the pressure changes which occur at higher altitudes and as a consequence of thermal stresses (heating up of the brake disks) and the associated changes in volume, and these processes can suck foreign bodies into the bearing assemblies.

Given this situation, it is an object of the present invention to provide a sealing arrangement which is distinguished by a long or increased service life and a high degree of reliability, even in contaminated or harsh surroundings.

According to the invention, this object is achieved by a sealing arrangement having the features of patent claim 1.

According to this, the sealing arrangement according to the invention provides a seal which extends in the circumferential direction of the bearing and is arranged in the region of the first bearing ring. The second bearing ring is provided with a circumferential sealing surface. At least two circumferential sealing lips of the seal rest sealingly on the sealing surface. A particularly reliable and long-lived sealing action is achieved through the provision of two seals, which are arranged in series and preferably spaced apart in relation to the leakage path extending from the interior region of the bearing assembly ("lubrication side") to the other, outer side of the bearing ("dirt side"). This sealing action helps to ensure that the bearing assembly is reliably and adequately protected, even in special cases of stress, e.g. in connection with the pressure equalization described at the outset and the frequently dusty environment of a runway in the case of an airplane. The result is that the bearing assembly has an increased service life and is more reliable, and this is reflected in reduced maintenance costs and a reduction in the associated costs of logistics for the user or operator.

It is a particular advantage of the invention that the often costly and high-value bearing assembly is protected in the long term by the use of a comparatively simple additional component. It is a further advantage of the invention that the sealing lips, which act independently of one another, can be configured differently, and, in particular, can be optimized according to different requirements.

According to an embodiment of the invention which is advantageous in this context, at least one sealing lip is designed so as to exhibit film-elastic resilience. In the context of the invention, a sealing lip exhibiting film-elastic resilience is one which is designed to run circumferentially as it were as a bracket-like extension and which, by virtue of elastic changes in its geometry, rests resiliently by its free end on the sealing surface.

An alternative or complementary embodiment of the invention advantageously provides that at least one sealing lip be designed so as to exhibit volume-elastic resilience. Volume-elastic resilience is understood to mean a resilience of the material of the sealing lip which is achieved through appropriate elastic deformation of the material of the sealing lip.

According to an advantageous development of the invention, the sealing action can be optimized and influenced by a spring element pressing the sealing lip onto the sealing surface. In this arrangement, the spring element may be a circumferential bending spring, preferably a spiral spring.

To further enhance the sealing action, especially in a second (the radial) dimension, a preferred development of the invention provides that the at least two sealing lips rest against an axially extending portion of the sealing surface, and that the seal has a further sealing lip, which rests against a radially extending sealing surface.

In principle, the sealing surface can be formed by partial areas of the surface of the second bearing ring. An embodiment of the invention which is preferred in this connection provides that at least part of the sealing surface be formed by an axial extension of the second bearing ring. This extension may preferably be formed as an integral component made from the material of the second bearing ring and extend in an axial direction toward the outside of the bearing assembly in the manner of a sleeve, for example. An extension of this kind is also referred to as a "board".

In order to further optimize the sliding properties of the sealing lip or sealing lips on the sealing surface, it is also possible for the sealing surface to be formed on a shaped element. It is particularly preferred in this connection if at least part of the sealing surface is formed on a sealing plate, which is mounted on an axial extension (board) of the second bearing ring.

In order to connect the seal to the first bearing ring in a manner which is particularly preferred from the point of view of assembly, provision is made for the circumferential seal to be held or arranged in an end-face receptacle of the first bearing ring.

Illustrative embodiments and further advantages of the invention are explained in greater detail below with reference to the drawing, in which:

FIG. 2 shows a first sealing arrangement according to the invention in detail; and FIG. 3 shows a second sealing arrangement according to the invention in detail.

Figure 1:
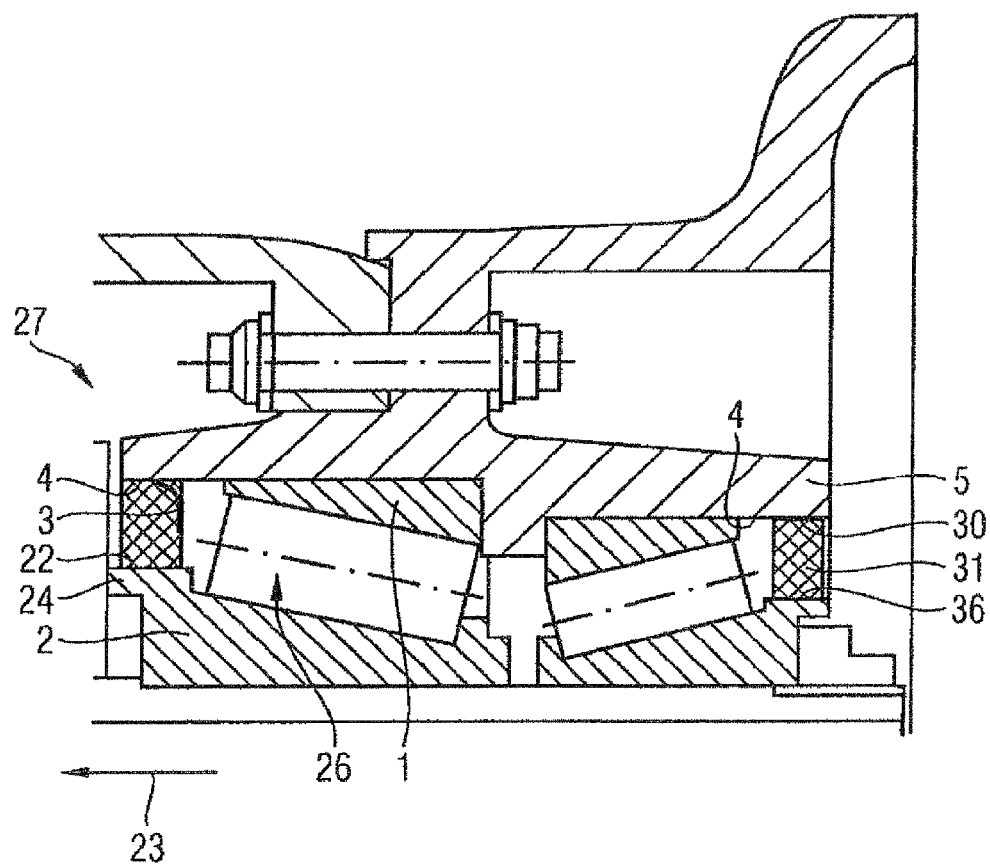
FIG. 1 shows an installation situation of a sealing arrangement according to the invention in schematic form.

In the figures, those elements which are the same or have the same function are provided with the same reference signs.

FIG. 1 shows a sealing arrangement for a bearing which comprises a first bearing ring 1 and a second bearing ring 2, which rotates relative to said first ring. A support 3 of the sealing arrangement is composed of stainless steel and is press-fitted into a bore 4 of a bearing outer ring housing 5. In the bearing assembly illustrated, a corresponding second bearing with a similar sealing arrangement is shown on the right hand side.

According to FIG. 2, the sealing arrangement suitable for an application in accordance with FIG. 1 may have a support 3 which is of P-shaped cross-section. A circumferential sealing ring 7 made of rubber is fixed in a connecting region 8 in the foot region of the P. The sealing ring has a first sealing lip 9 and a second sealing lip 10. The first sealing lip is in the form of a thin projecting extension 12 similar to a bracket in cross section. This construction is also referred to as one which exhibits film-elastic resilience, because the extension 12 can be deflected in the manner of a hinge in the direction of arrow 15 in the region of connection 13 to the rest of the rubber material 14.

The second sealing lip 10 is formed by an circumferential material tip 18, which with its tip forms substantially linear contact 19 with the surface 22 of the second bearing ring 2 (see also FIG. 1). The surface is formed by a sleeve-shaped extension 24 which extends outward in an axial direction 23. When the second bearing ring rotates about the longitudinal axis, the sealing lips 9, 10 slide on the surface of the extension 24. In order to enhance the sealing action of the second lip, a circumferential spiral spring 25 is provided, said spiral spring exerting a spring force on the extension 24 in a radial direction owing to its being expanded slightly, and hence pressing the second sealing lip 10 into contact.

This sealing arrangement in itself ensures excellent dust-proof and media-proof sealing of the interior region 26 of the bearing arrangement with respect to the exterior region 27.

FIG. 3 shows a variant of a sealing arrangement for a bearing, a support plate 30 being press-fitted into the bore 4 of the bearing outer ring housing 5 (see also FIG. 1). The support plate 30 holds a circumferential seal 31, which is composed of a flexible rubber material. The seal 31 has a first sealing lip 32, which is designed as a sealing lip exhibiting film-elastic resilience in a configuration which has already been explained in detail in connection with FIG. 2. A second sealing lip 33 is pressed onto the surface of a sealing plate 35 by means of a spiral spring 34 in the manner already described in detail above. The first sealing lip 32 runs on the surface 36 (only indicated) of the second bearing ring. The surface 36 is formed by the lateral surface of an axial sleeve-shaped extension (board). The sealing plate 35 is arranged substantially at a right angle and is pushed by means of its inner region onto the extension. A radially extending second region 37 of the sealing plate forms a further surface 38, on which a further (third) sealing lip 39 is sealingly supported and exhibits film-elastic resilience owing to its peripheral geometry, which is bracket-like. To this extent, the surface of this region of the sealing plate forms a radial sealing surface 40.

The present invention is preferably used in airplane landing gear because reliable sealing of the landing gear bearing assemblies, with a long service life even under extreme operating conditions, is particularly important in this area. With the sealing arrangement according to the invention, improved protection against the intrusion of external media (e.g. dirt or water) is achieved. At the same time, dirt and foreign particles are also reliably prevented from being drawn in, in particular as a result of the cooling of the bearing assembly or in the case of pressure fluctuations. Moreover, the interior of the bearing assembly is sealed relative to the surroundings, and the risk that oil or grease will escape is therefore minimized for the sake of improved protection of the environment.

List of Reference Signs

1 First bearing ring
2 Second bearing ring
3 Support
4 Bore
5 Bearing outer ring housing
7 Sealing ring
8 Connecting region
9 Sealing lip
10 Sealing lip
12 Extension
13 Region of connection
14 Rubber material
15 Direction of arrow
18 Material tip
19 Contact
22 Surface
23 Axial direction
24 Extension
25 Spiral spring
26 Interior region
27 Exterior region
30 Support plate
31 Seal
32 First sealing lip
33 Second sealing lip
34 Spiral spring
35 Sealing plate
36 Surface
37 Region
38 Surface
39 Sealing lip
40 Sealing surface

The invention claimed is:

1. A sealing arrangement for a bearing of an airplane landing gear, comprising:
   a first hearing ring; and
   a second bearing ring, rotatable relative to the first bearing ring,
   wherein a circumferential seal extending in a circumferential direction of the bearing is arranged in a region of the first bearing ring and separates an exterior region from an interior region of the hearing,
   wherein the second bearing ring has a circumferential sealing surface, and
   wherein the circumferential seal has only two circumferential sealing lips that rest sealingly on the sealing surface, one of said circumferential sealing lips facing the exterior region of the bearing and being formed as a projecting extension having a bracket-shaped cross section and being deflectable in a hinged manner and another of said circumferential sealing lips facing the interior region of the bearing and having a circumferential material tip making linear contact with said sealing surface.

2. The sealing arrangement of claim 1, wherein the one of the circumferential sealing lips is designed so as to exhibit film-elastic resilience.

3. The sealing arrangement of claim 1, wherein the another of the circumferential sealing lips is designed so as to exhibit volume-elastic resilience.

4. The sealing arrangement of claim 1, wherein a spring element presses the another of the circumferential sealing lips onto the sealing surface.

5. The sealing arrangement of claim 4, wherein the spring element is a spiral spring.

6. The sealing arrangement of claim 1, wherein the sealing lips rest against an axially extending portion of the sealing surface.

7. The sealing arrangement of claim 1, wherein at least part of the sealing surface is formed by an axial extension of the second bearing ring.

8. The sealing arrangement of claim 1, wherein at least part of the sealing surface is formed on a sealing plate, which is mounted on an axial extension of the second hearing ring.

9. The sealing arrangement of claim 1, wherein the circumferential sea is arranged in an end-face receptacle of the first bearing ring.

* * * * *